(12) United States Patent
Morrison

(10) Patent No.: US 7,978,184 B2
(45) Date of Patent: Jul. 12, 2011

(54) INTERACTIVE WINDOW DISPLAY

(75) Inventor: James C. Morrison, North Ridgevill, OH (US)

(73) Assignee: American Greetings corporation, Cleveland, OH (US)

( * ) Notice: Subject to any disclaimer, the term of this patent is extended or adjusted under 35 U.S.C. 154(b) by 708 days.

(21) Appl. No.: 12/102,171

(22) Filed: Apr. 14, 2008

(65) Prior Publication Data

US 2008/0192027 A1    Aug. 14, 2008

Related U.S. Application Data

(63) Continuation of application No. 10/290,918, filed on Nov. 8, 2002, now abandoned.

(51) Int. Cl.
*G09G 5/00* (2006.01)

(52) U.S. Cl. ........................................ 345/173; 173/177

(58) Field of Classification Search .......... 345/156–158, 345/173–179; 178/18.01, 18.03–18.11
See application file for complete search history.

(56) References Cited

U.S. PATENT DOCUMENTS

| | | | |
|---|---|---|---|
| 6,522,311 B1 * | 2/2003 | Kadowaki et al. | 345/7 |
| 6,545,670 B1 * | 4/2003 | Pryor | 345/173 |
| 6,864,882 B2 * | 3/2005 | Newton | 345/173 |

* cited by examiner

Primary Examiner — Regina Liang
(74) Attorney, Agent, or Firm — Roetzel & Andress

(57) ABSTRACT

A method and system for providing an enhanced and interactive window shopping and retail information exchange with shoppers, includes acoustic sensing in connection with one or more storefront windows of a retail store, and a corresponding transparent display located within the store and visible through the storefront window, the interior of the store being visible through the transparent display. Display of information on the transparent display, and in optional combination with audio information external to the store, prompts shoppers to tap the storefront window at locations which correspond to the locations of information displayed on the transparent display. The system and method is programmed to respond to taps on the window according to the locations of the taps with incentives to enter the store and/or to redeem awards or coupons in the store.

12 Claims, 2 Drawing Sheets

INTERACTIVE WINDOW DISPLAY

RELATED APPLICATIONS

This application is a continuation of U.S. patent application Ser. No. 10/290,918, filed Nov. 8, 2002 now abandoned.

FIELD OF THE INVENTION

The present invention pertains generally to interactive displays, and more specifically to a method and system for implementing an interactive display window with multiple transparent surfaces.

BACKGROUND OF THE INVENTION

Attention is directed to a masters thesis by Nisha Checka entitled "A System for Tracking 15 and Characterizing Acoustic Impacts on Large Interactive Surfaces" (MIT, May, 2001) and J. D. Paradiso, K. Hsiao, J. Strickon, J. Lifton, and A. Adler, "Sensor Systems for Interactive Surfaces," IBM Systems Journal 39, Nos. 3&4, 892-914 (2000), both of which are hereby incorporated by reference.

Large flat surfaces, such as glass windows, are common structures in everyday life. Because of a window's transparent nature, it is often used in showroom displays, or as a conduit through which one can view an area of a showroom. Without additional enabling circuitry, common glass windows are passive surfaces. While different products generally centered on the theme of "home automation" have inspired various interactive displays, these are usually hand-held, small or moderate-sized discrete electronic devices, such as touch screens or monitors that are embedded into walls, kiosks or tables. The use of large portions of the walls, floors, or windows themselves as interactive interfaces, except perhaps in niche applications such as those used for teleconferencing, is rare. As new technologies evolve, architectural surfaces are becoming more sensate, following trends and concepts in smart skins developed in the areas of structural control and aerospace research over the last decade.

Most of the commercial products that have been developed to track position across a large, responsive surface have been aimed at the hand-held digitizing tablet and "smart whiteboard" markets, where handwriting from a writing instrument (such as a coded pen, or the styles used with the Palm Pilot™) is digitally captured. While many of these systems require contact or pressure to be applied against a sensitive surface and act as a large touch screen or trackpad, others detect the position of objects just above a board or tablet. The bulk of these devices are made to work with electronic sensing technology (usually nontransparent) within or beneath the active area. One interesting example of a recent, noncommercial sensing surface is the pixilated capacitive matrix devised by Post and collaborators at the MIT Media Lab for their sensor table developed for an installation at the Museum of Modern Art in New York. Although this technique can detect and track nearby bare hands through their capacitive loading, it does not scale easily in large areas and is generally opaque; therefore it is not suited to rear-projection applications. For smaller surfaces, transparent conductors such as indium-tin oxide ("ITO") or conductive plastic can be used as in capacitive touchscreens, but extending such fine sampling or pixilated concepts to very large displays becomes complicated and expensive with existing technologies.

Most tracking systems for translucent or very large wallboards are the "squinting" type that look across from the edges of the display. Although inexpensive devices exist that use acoustic time-of-flight to a fixed receiver from active sonar pingers embedded in pens, several employ optical sensing, which enables simple, passive reflecting targets on the drawing objects to be easily detected in a sensitive plane defined by a scanning fan-collimated light source, such as generated by a scanned diode laser. For example, a pair of scanning lasers emanate from the two top corners of a board, identifying and tracking coded targets on pens and other objects approaching the whiteboard and intersecting the scanned plane. These sensors are unable to detect distance, thus planar position is determined by triangulating the two angular measurements. To avoid ambiguities in this triangulation, these systems generally allow only one object to be tracked at a time. Although such systems require coded targets, research systems have been designed to use a similar arrangement to track single fingers and bare hands. Light-Curtains, which use dense arrays of infrared light-emitting diodes ("IR LEDs") that face corresponding receivers lining the perimeter of the screen, are commercially available and can track multiple hands, but because of poor scalability, become expensive for large displays. A variant on this approach is the Intrepid touch system, which uses an array of IR LEDs across the top of the display and two linear CCD arrays at the corners that look for reflections from the hands. Unfortunately, this technique can become problematic with large screens as it is expensive and illumination difficulties often persist.

Some smart wail hand-tracking systems use computer vision. The most straightforward versions of these use multiple cameras, squinting along the horizontal and vertical coordinates and triangulating. Although this approach is capable of providing a great deal of information potentially enabling hand gesture to be determined), it involves a considerable amount of sometimes fragile video processing to detect the hand, reject background light and clutter, and solve the image-correspondence problem for multiple hands.

Another technique is "chroma-key", which is one that looks from the front of a screen. In this technique, the silhouette of the body is detected against a plain blue or bright screen, whereupon the hands are identified and tracked when not in front of the torso, similar to systems employed during weather broadcasts. Although the newscaster only gestures in front of a blue screen in the studio, the screen is replaced by the weather map in the broadcast video. For increased precision, lower ambiguity, higher speed, and the ability to work with variable background light or an image-bearing screen, many classic body-tracking systems have exploited active targets made from modulated IR LEDs that must be placed on or carried by the user.

Recent work by the MIT Media Laboratory's Responsive Environments Group on new user interface devices for interactive surfaces and large-scale public installations has led to the development of technologies such as an interactive wall which tracks hand positions with a low-cost scanning laser rangefinder and a smart window that locates finger taps using differential acoustic time-of-arrival. Such technologies, independently and in combination, turn an ordinary window into an input device, analogous to a touchscreen or mouse.

BRIEF SUMMARY OF THE INVENTION

In accordance with the present invention, there is provided an interactive display system which utilizes acoustic coordinate identifying technology. The display system of the invention is applied in one embodiment to a showroom window, with acoustic location means for determining the location of a tap on the window made by a shopper or passer-by. The system fiercer comprises display means for displaying information responsive or otherwise related to the determined location of the top, while maintaining at least partial transparency through the area in which information is displayed. Thus, the interactive display system does not obstruct the view through the window.

Also, in accordance with the present invention, there is provided a method for interactive display of information in connection with a window such as a storefront window. The method involves the use of a showroom window and an at least partially transparent display that is viewable from outside the showroom through the window. After a user makes an acoustic contact or "tap" with the showroom window, the coordinate location of the tap on the window is determined by acoustic-electrical processing means. Information is then displayed that is responsive to the determined location of the tap. Preferably, at least partial transparency is maintained through the area in which information is displayed.

Also, in accordance with the present invention, there is provided a retail business method for awarding a coupon to a window shopper. A graphical or textual user interface is provided to the window shopper wherein the interface comprises a window and a display viewable from an exterior side of the window. An acoustic contact or tap made with the window by the shopper is received and its location determined. In response to or depending upon the particular determined location of the tap, a coupon is awarded to the window shopper, as further described herein.

DETAILED DESCRIPTION OF THE INVENTION

In a preferred embodiment of the invention, an acoustic tap tracking system is used to create an interactive window, which may be a display window such as in a retail store. While rangefinder systems are well adapted for tracking hands, they are less adapted to notions like the "click" of a mouse, a commonplace action in today's standard graphical user interface ("GUI"). There are several clean gestures by which the notion of a "clink" can be adopted; for example, moving ones hand quickly in and out of the scan plane or pulsing the nontracked other hand rapidly in and out of the beam, etc. The most direct method of clicking, however, would be to just tap the surface. With only one hand being tracked, this is straightforward; a simple acoustic transducer affixed to the screen suitably detects the tap and announces a "click" event. With multiple hands, however, the tracking becomes more problematic, as planar rangefinders generally provide no means by which to determine which hand was responsible for the contact. To resolve such issues and explore a different kind of smart surface interface, the Tangible Media Group at MIT developed an acoustic tap locating/tracking system.

Figure 1:
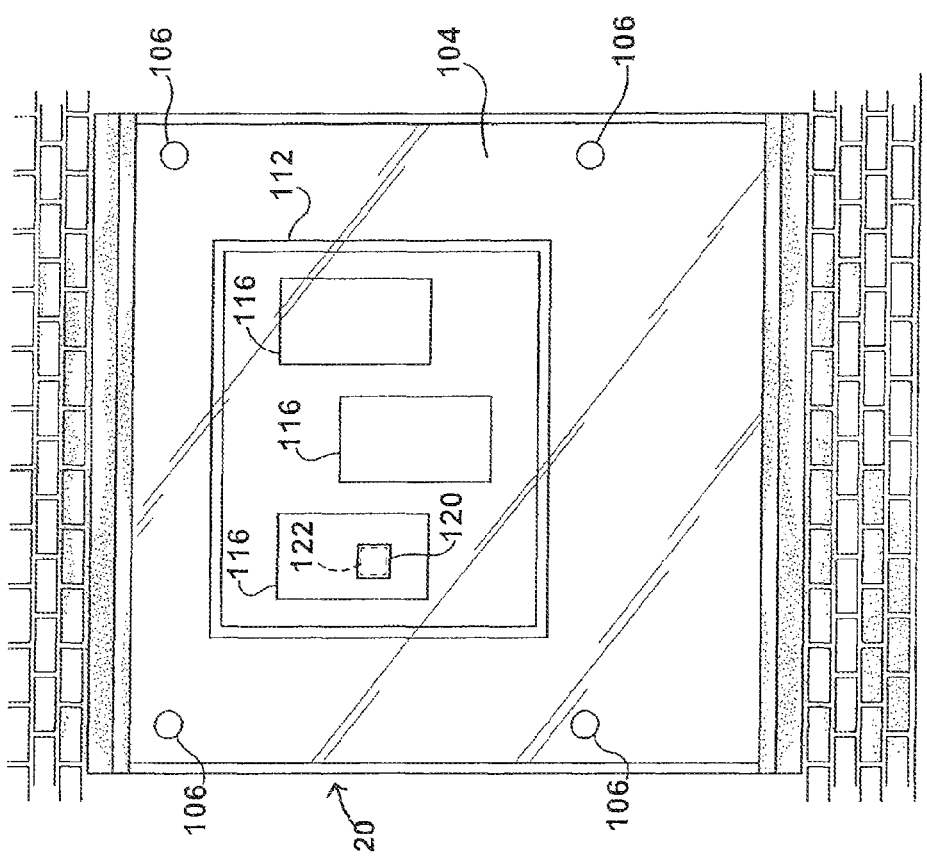
FIG. 1 is an illustration of an acoustic tap tracking system of the present invention.

FIG. 1 is an illustration of an acoustic tap tracking system like that developed at MIT. The system is designed to locate the position of a tap, knock or contact indicated generally at location 102 upon a sensing surface 104. In order to determine the location of tap 102, a plurality of contact sensors or pickups 106 are attached or secured to the sensing surface 104. A preferred embodiment, there are four sensors 106, which are preferably polyvinylidene fluoride ("PVDF") piezoelectric foil sensors, attached to the sensing surface 104 (alternatively "glass 104") which is preferably glass preferred for its physical properties as a medium for travel of acoustic energy in wave form therethrough. However, any rigid material with similar properties can be used as sensing surface 104. When a tap is made upon the glass 104, acoustic energy propagates through the glass 104 and is sensed by sensors 106. If the tap is closer to one sensor 106 than another sensor 106, less time will pass before the acoustic energy arrives at the sensor to which the tap location 102 is closest. Therefore, the tap location 102 is determined by the differential time-of-arrival of acoustic energy at multiple locations, in this case, four sensors 106 positioned at corners.

A microcontroller 108 is used to continuously sample the signals from each sensor 106 into a rotating buffer. Upon detecting a transducer signal above a defined threshold, a "tap" event is declared, and 10 millisecond (ins) worth of data are stored from all four inputs (including 3 ms of data before the trigger occurred). This buffer is then scanned for every significant peak in the absolute-value waveform produced by each transducer, and descriptive parameters (e.g., peak height, width, and mean arrival time relative to the initial trigger) are extracted for each peak (including any small peaks arriving earlier, as discussed above). These parameters are sent, together with a count of the number of zero-crossings across the data acquisition interval. A connected digital signal processor 110 then processes the timing determined for each first peak by a second-order polynomial that was obtained from a linear least-squares fit to a set of calibration points to produce an estimate of the impact location in Cartesian coordinates.

In addition to increasing the reliability of the results, the use of a microcontroller 108 readily enables more channels of gestural input (e.g., measuring the strike intensity and classifying the type of strike). Also, because the system has four sensors 106, accuracy and validity are suitably increased by cross-checking the detected waveform characteristics from the different sensors and examining the differences between the four position estimates obtained from the four different sensor 106 triplets. Only three sensors 106 are necessary to locate a contact 102. Because there are four sensors, there exists one redundant degree of freedom. Therefore, results from each of the four sets of three sensors 106 are preferably compared to improve accuracy.

Figure 2:
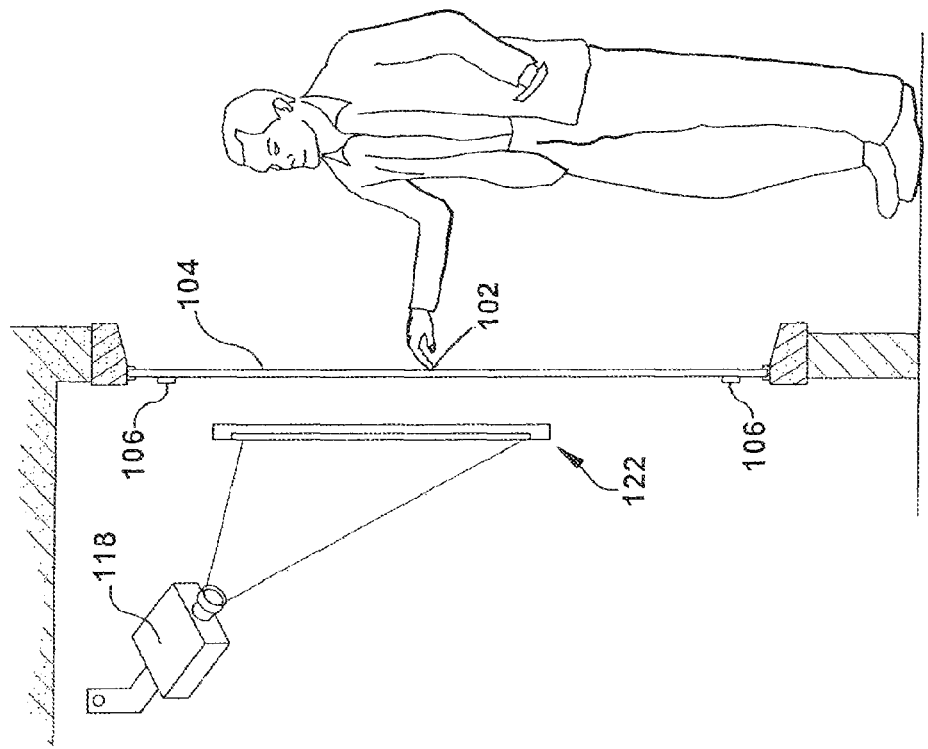
FIG. 2 is an illustration of an interactive window display system of the present invention.

Turing now to FIG. 2, an illustration of an interactive showroom display system in accordance with the present invention is provided. As shown, the showroom display system comprises display means 112 in conjunction with location means, which is preferably the acoustic tap tracking system of FIG. 1. The glass 104 is preferably a showroom display 20 window and the sensors are preferably PVDF piezoelectric sensors. Display means 112 is suitably any display means for displaying information and suitably comprises a hologram, or film irradiated with a refractive grid. A preferred display means 112 is a HoloPro™ display device available from G+B pronova GmbH, Bergisch Gladbach, Germany. The HoloPro™ is a transparent refractive panel upon which an image can be projected from the rear at an oblique angle and displayed clearly toward the front. The unique aspect of HoloPro™ is that the display medium is transparent, and an image projector can be located outside of the boundaries of the display. When used in combination with a window in accordance with this invention, the HoloPro™ display, while displaying a projected image, does not obstruct the view through the window (and the display). This novel combination is therefore particularly advantageous in retail store window applications, whereby an active and interactive display is combined a traditional storefront window. hi addition, the system suitably comprises audio means for providing audio feedback as well as visual feedback responsive to the determined location of a contact 102. The audio means is also suitably used as means for initially attracting a user to the interactive showroom display system.

Preferably, the display means comprises a plurality of individual holograms irradiated alongside one another onto a holographic film. Each holographic optical element ("HOE") suitably has its own defined deflection angle such that each HOE has a unique angle sensitivity. The system also preferably comprises a projector 118 to irradiate the holograms. In the presently preferred embodiment, display means 112 comprises a screen, which is film laminated between two panes of glass to provide mechanical stability and protect the film from dirt and dampness. The projector 118 is preferably configured such that the light projected from the projector irradiates the holograms at specific angles. A specific angle of projection in combination with angle sensitivity allows ambient light to pass without significant reflection or refraction through the screen and without otherwise materially affecting the optical quality of the projection. When the projector is switched off, the screen appears transparent and the observer can see straight through it. When the projector is on, an observer can still see through the screen. In other words, the display means 112 preferably maintains at least partial transparency through the area in which information is displayed. As will be appreciated by those skilled in the art, the display means is therefore suitably any display means capable of maintaining at least partial transparency through the area in which information is displayed such that a window shopper can view items inside the showroom through the display means.

As shown in FIG. 2, the display means 112 and the user or window shopper are preferably separated by the window 104. Preferably, in order to maximize intuitive use, the location means is configured to determine the location of a contact 102 relative to the position of the display means In other words, even though the screen or display means 112 is suitably separated from the showroom window 104, the system is suitably configured such that each coordinate on the display means corresponds to a coordinate on the showroom window 104. For example, display means displays information 116, which prompts a user to contact the showroom window 104. As shown in FIG. 2, the information 116 prompts a user to select from one of three choices. To select one of the tree choices, the user preferably contacts the showroom window 104 in front of the desired selection. The contact 102 is represented by location 120 on the showroom window. Location 120 on the showroom window 104 corresponds to location 122 on display means 112.

Figure 3:
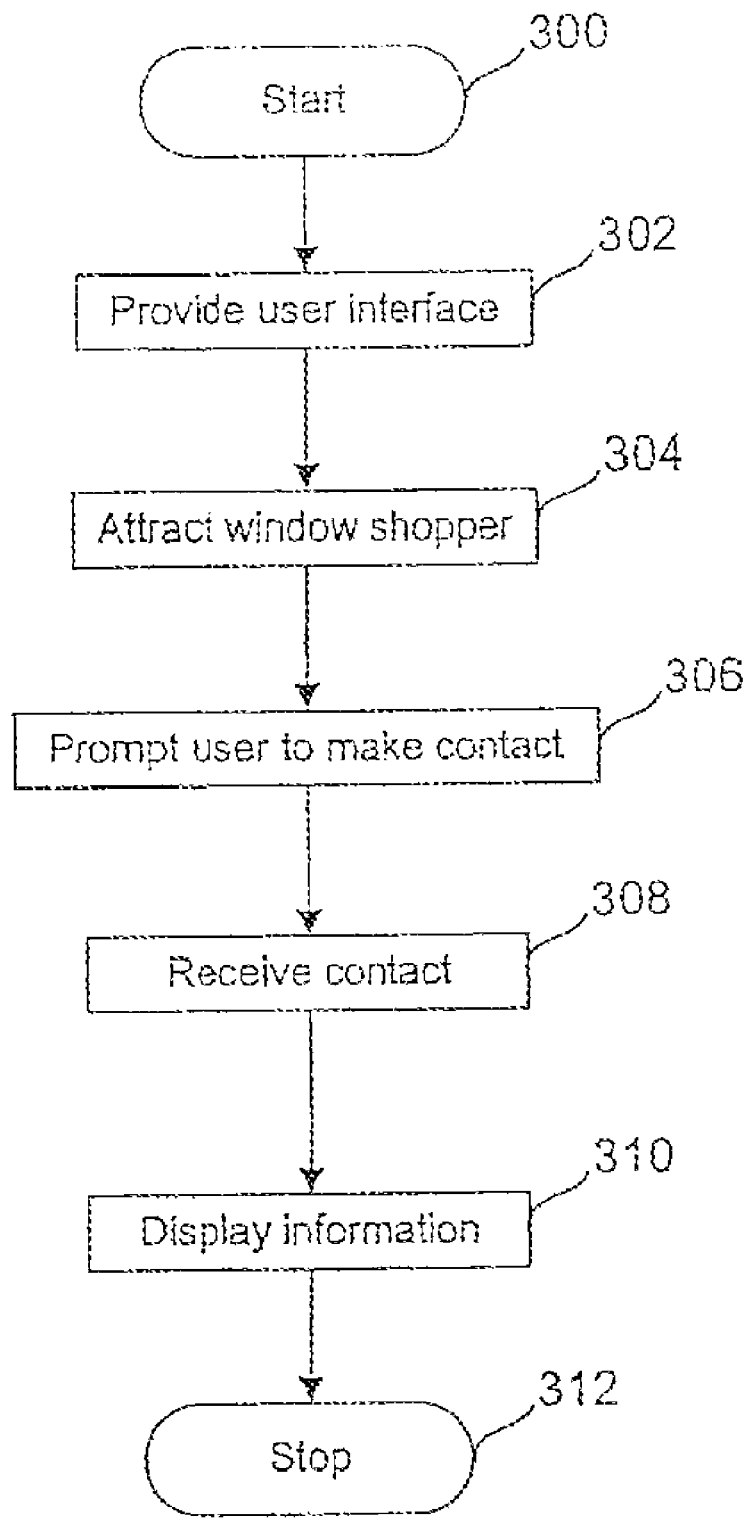
FIG. 3 is a flowchart of a method of displaying information in accordance with the present invention.

Turning now to FIG. 3, a flowchart generally depicting a method of displaying information in accordance with the present invention is provided. The general flow commences at star block 300, from which progression is made to process block 302. At process block 302, a user interface is provided. The user interface suitably comprises a showroom window 104 and an at least partially transparent display 112 viewable from the exterior side of the showroom window 104. Preferably, the user interface is of the type shown in FIGS. 1 and 2.

Progression then flows to process block 304 wherein a window shopper or user is suitably attracted. The attraction of the window shopper is suitably accomplished through visual and/or audio means. Flow then continues to process block 306 wherein the window shopper is prompted to make a contact to the showroom window. The prompting of the window shopper suitably comprises providing visual and/or audio stimuli. Any suitable form of prompt is contemplated by the present invention. For example, audio instructions are suitably broadcast to the window shopper, textual instructions are suitably displayed, etc. It should be noted that the prompt is also suitably implied, such as through the use of a button, a graphic, a simple list of choices, of other means as will be appreciated by those skilled in the art.

Preferably, the window shopper is prompted to select from a plurality of selections. In selecting, the window shopper taps window 104 at a location 120 which corresponds to a position 122 on display means 112.

Progression then continues to process block 308, wherein after receiving a contact to the showroom window 104 by the window shopper, the system then preferably determines the location of the tap. The determined location of the tap is suitably correlated with a position on the display. This correlation allows the window and display means to act in combination like a touch screen. The determined location is then suitably compared with predefined criteria. Depending on the criteria definitions and the determined location, the system preferably displays information to the window shopper at process block 310.

The displaying information at process block 310 also suitably comprises providing audio feedback responsive to the determined location of the contact. The information displayed is suitably any information and is not necessarily related to a product or company. In the presently preferred embodiment, the display means maintains at least partial transparency through the area in which information is displayed. In response to meeting certain criteria, the system suitably displays information about at least one product that is available for purchase. The product available for purchase is suitably available for purchase in the showroom or via the Internet. In addition, the system also suitably displays company information in response to the contact. Also, information displayed is suitably related to a showroom promotion or to instructions for obtaining or redeeming a coupon inside the showroom. It will be appreciated by those skilled in the art that the displayed information is suitably any information, such as sales information, coupon information, promotion information, information displayed solely for entertainment purposes, etc.

In the case where displayed information is related to a coupon, a coupon is suitably awarded to a user. The system is suitably configured to interact with showroom databases such that a coupon code is generated by the display system, after which the coupon can be redeemed within the showroom. Alternately, the showroom display system suitably generates any type of redeemable coupon code, even though not in interaction with other systems. The coupon awarded to a user is preferably selectively awarded to the user based upon the determined location of contact. In one presently preferred embodiment, the system initiates a game which the window shopper is prompted to play. The game is configured to receive user input in the form of a contact to the showroom window. Upon successful completion of the game, the window shopper is awarded a coupon.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

The invention claimed is:

1. An interactive retail storefront display system comprising an acoustic tap tracking system in combination with a storefront window of a retail store, the acoustic tap tracking system configured to locate the position of a tap, knock or contact with the storefront window, a plurality of contact sensors or pickups attached to the storefront window whereby when tap contact is made with the glass of the storefront window acoustic energy propagates through the glass and is sensed by the sensors of the acoustic tap tracking system which is configured to determine a location of the tap contact on the storefront window by calculation of time for acoustic energy propagation through the glass to the closest relative contact sensor and by the differential time-of-arrival of acoustic energy at multiple contact sensor locations on the storefront window, the acoustic tap tracking system further comprising a microcontroller programmed to continuously sample acoustic signals from each contact sensor into a rotating buffer which is scanned for peak values in an absolute-value waveform produced by the transducers, to produce parameters which are sent to a digital signal processor programmed to estimate the tap contact location on the storefront window glass in Cartiesian coordinates, and every coordinate on the display corresponds to a coordinate on the storefront window;
    a display located in the retail store on an interior side of the storefront window and spaced from and generally parallel with the storefront window, the display comprising a holograph in the form of a transparent refractive panel upon which images can be projected by a projector from a side of the display opposite to the storefront window and at an oblique angle and whereby images are displayed clearly toward and visible through the storefront window, the images being projected from the projector which is located at an oblique angle from and outside of boundaries of the display and the storefront window so that the display does not obstruct a view of the interior of the retail store through the storefront window.

2. The interactive retail storefront display system of claim 1 further comprising audio means for providing audio information to a window shopper located in front of the storefront window both before and after tap contact with the storefront window, the audio information corresponding to images projected on to the display.

3. The interactive retail store front display system of claim 1 wherein the displayed images are comprised of a plurality of individual holographic optical elements irradiated alongside one another onto a holographic film which is part of the display, and wherein each holographic optical element has a unique angle of projection and a, unique angle sensitivity, the unique angles of projection and unique angles of sensitivity allowing ambient light to pass through the display without significant reflection or refraction through the display and without materially affecting the optical quality of the projection.

4. The, interactive retail storefront display system of claim 1 wherein when the projector is off, the screen appears transparent and the, interior of the retail, store on a Side of the display opposite to a viewer is visible.

5. The interactive retail storefront display system of claim 1 wherein the display is at least partially transparent through areas in which information is displayed on the display.

6. The interactive retail storefront display system of claim 1 wherein when the projector is turned on, the screen appears transparent and the interior of the retail store on a side of the display opposite to a viewer is visible.

7. The interactive retail storefront display system of claim 1 configured such that each coordinate on the display corresponds on the storefront window irrespective of relative spacing or alignment of the display with the storefront window.

8. The interactive retail storefront display system of claim 1 wherein, each location on the display corresponds to a unique location on the storefront window by the acoustic tap tracking system.

9. The interactive retail storefront display system of claim 3 wherein the peak values detected by the sensors include peak height, width, and mean arrival time.

10. The interactive retail storefront display system of claim 1 wherein the digital signal processor is programmed to process timing values for each peak value of a detected tap or contact by a second-order polynomial obtained from a linear least-squares fit to a set of calibration points to produce an estimate of the tap or contact location on the storefront window.

11. An interactive window shopping system configured for use with a retail store having a generally planar storefront window located in wall of the store, the storefront window having an exterior side and an interior side, an interior of the store being visible through the storefront window, the interactive window shopping system comprising:
    a display located in the interior of the store and spaced from and generally parallel with the storefront window, the display comprising a holograph in the form of a transparent refractive panel upon which images can be projected from aside of the display opposite to the storefront window and at an oblique angle and whereby images are displayed clearly toward and visible through the storefront window,the images being projected from a projector which is located in the interior of the store and at an oblique angle from and outside of the boundaries of the display and the storefront window so that the display does not obstruct a view of the interior of the retail store through the storefront window;
    an acoustic tap tracking system operatively connected to the storefront window and configured to locate the position of a tap, knock or contact with the storefront window and further comprising a plurality of contact sensor or pickups attached to the storefront window;
    whereby when tap contact is made with the storefront window acoustic energy propagates through the storefront window and is sensed by the sensors of the acoustic tap tracking system which is configured to determine a location of the tap contact on the storefront window by calculation of time for acoustic energy propagation through the storefront window to the closest relative sensor and by the differential time-of-arrival of acoustic energy at multiple sensor locations on the storefront window, the acoustic tap tracking system further comprising a microcontroller programmed to continuously sample acoustic signals from each sensor into a rotating buffer which is scanned for peak values in an absolute-value waveform produced by the transducers, the peak values including peak height, width, and mean arrival time to produce parameters which are sent to a digital signal processor programmed to process timing values for each peak by a second-order polynomial obtained from a linear least-squares fit to a set of calibration points to produce an estimate of the tap contact location on the storefront window glass in Cartiesian coordinates, and every coordinate on the display corresponds to a coordinate on the storefront window;

audio means configured to send prompt signals proximate to the exterior of the store and proximate to the storefront window, the audio prompt signals prompting a shopper to tap or contact the storefront window;

first images displayed on the display which are visible through the store front window, the first images including images which prompt a shopper to tap or contact the storefront window, the first images further including multiple images at multiple locations on the display which correspond with multiple locations on the storefront window, the second images displayed on the display in the response to a sensed location of a shopper's tap on the storefront window during display of first images.

12. The interactive window shopping system of claim 11 wherein the audio configured to send audio response signals in response to a shopper's tap or contact with the storefront window, and wherein the audio response signal pertains to a sensed location of the shoppers tap or contact with the storefront window.

* * * * *